July 20, 1943.  N. T. SAWDEY  2,324,882
AUTOMATIC STEERING APPARATUS
Filed Oct. 18, 1941   5 Sheets-Sheet 1
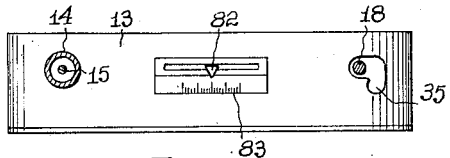
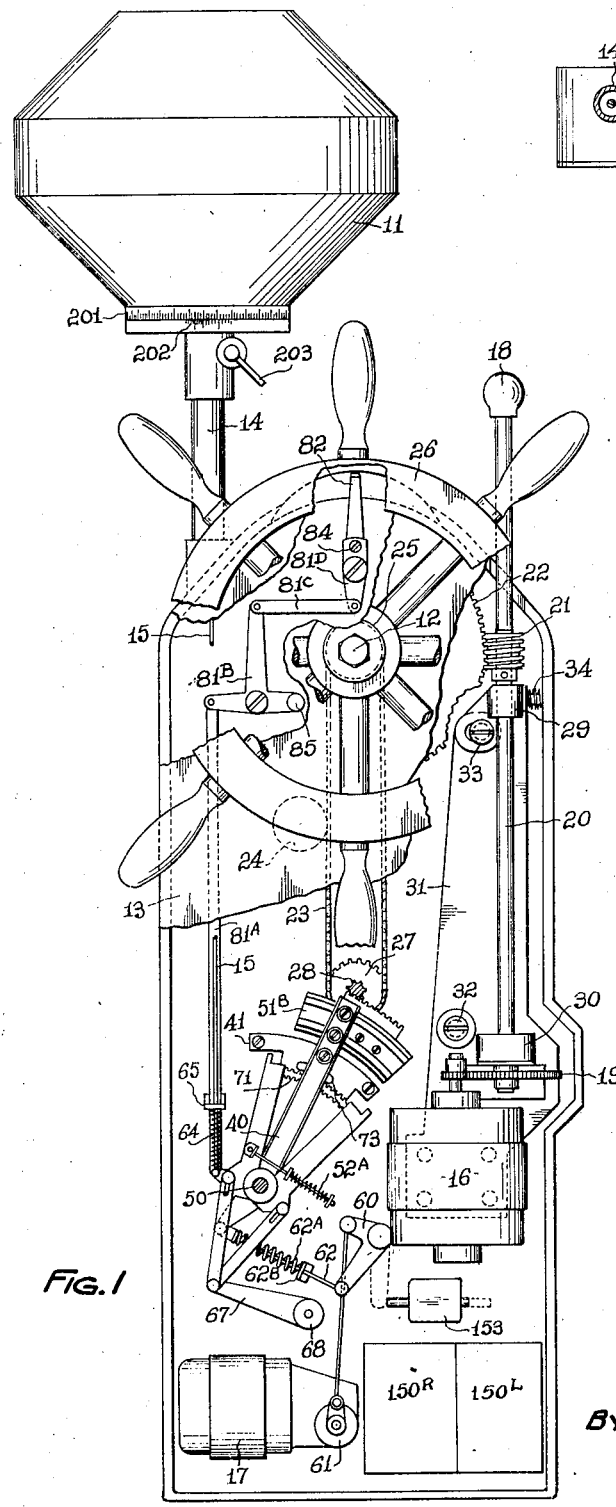
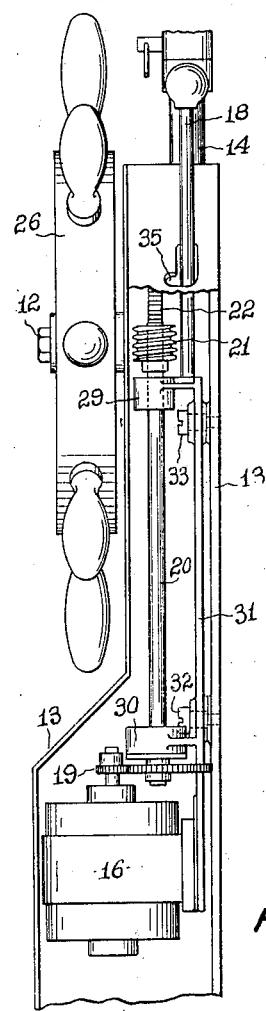
INVENTOR:
NEIL T. SAWDEY
BY Robert W. Wilson
ATTORNEY.

July 20, 1943.  N. T. SAWDEY  2,324,882
AUTOMATIC STEERING APPARATUS
Filed Oct. 18, 1941  5 Sheets-Sheet 2

Rudder Amidships

Full Right Rudder

Full Right Rudder

Rudder Amidships

Slight Right Rudder

INVENTOR:
NEIL T. SAWDEY
BY Robert W. Wilson
ATTORNEY.

July 20, 1943.   N. T. SAWDEY   2,324,882
AUTOMATIC STEERING APPARATUS
Filed Oct. 18, 1941   5 Sheets-Sheet 3

INVENTOR:
NEIL T. SAWDEY
BY Robert W. Wilson
ATTORNEY.

July 20, 1943.    N. T. SAWDEY    2,324,882
AUTOMATIC STEERING APPARATUS
Filed Oct. 18, 1941    5 Sheets-Sheet 4
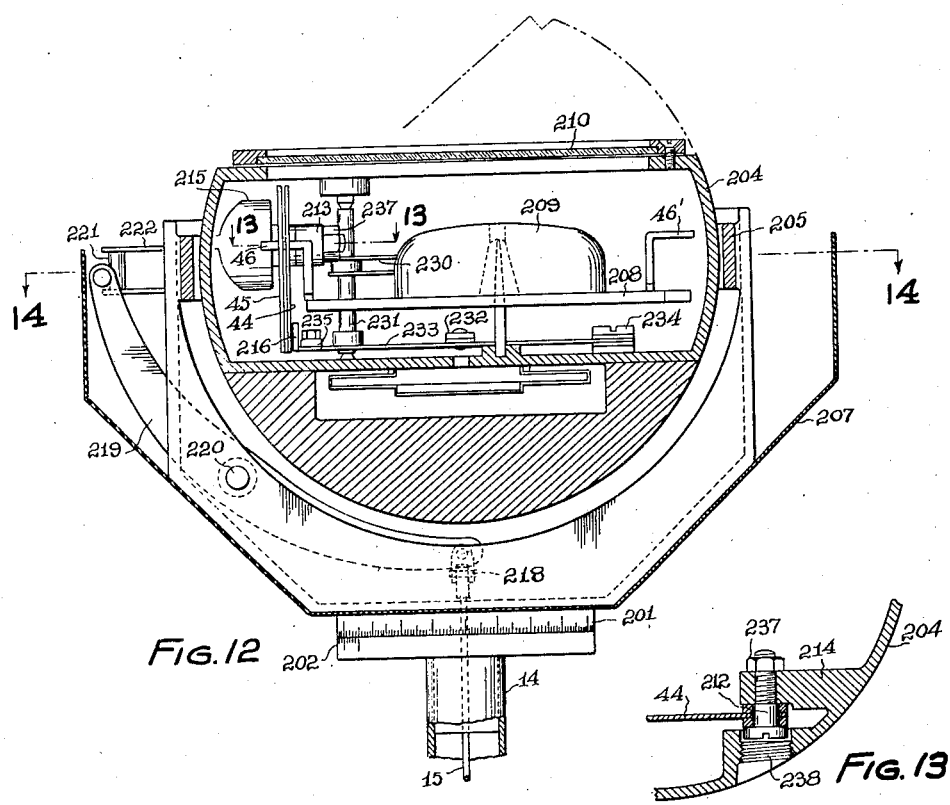
Fig. 12
Fig. 13
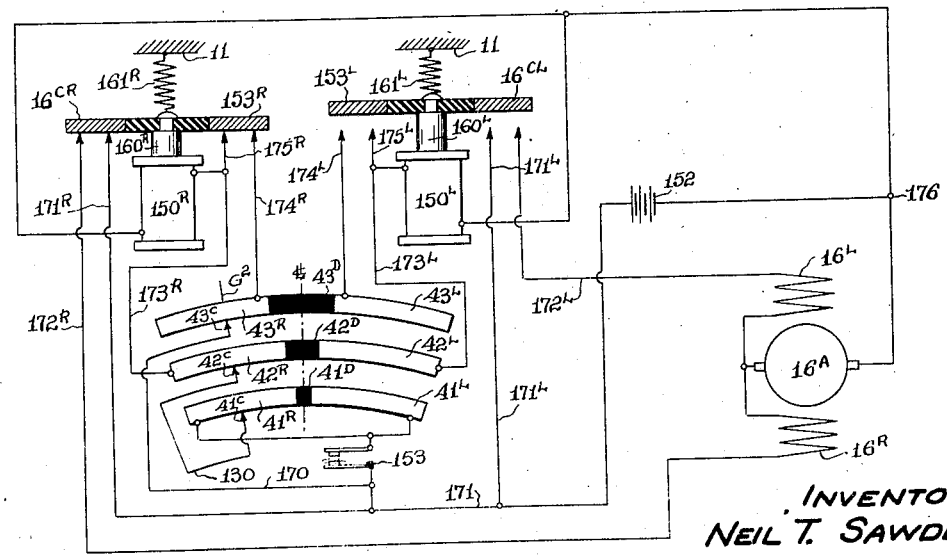
Fig. 11
INVENTOR:
NEIL T. SAWDEY
BY Robert W. Wilson
ATTORNEY.

July 20, 1943.  N. T. SAWDEY  2,324,882
AUTOMATIC STEERING APPARATUS
Filed Oct. 18, 1941  5 Sheets-Sheet 5

INVENTOR:
NEIL T. SAWDEY
BY Robert W. Wilson
ATTORNEY

Patented July 20, 1943

2,324,882

UNITED STATES PATENT OFFICE 2,324,882

AUTOMATIC STEERING APPARATUS

Neil T. Sawdey, Shaker Heights, Ohio

Application October 18, 1941, Serial No. 415,543

15 Claims. (Cl. 114—144)

This invention relates to automatic steering mechanism for vessels. While not limited to any particular class or size, it aims particularly to provide automatic steering apparatus characterized by simplicity and compactness, capable of manufacture in a price range available for small moderate priced pleasure and commercial craft, the invention being easy to attach to boats already built, simple to operate, not likely to get out of order, readily serviced and repaired, and requiring only slight power.

Other purposes and advantages of my invention will be apparent from the following description of a preferred form, it being understood that such preferred form, illustrated and described in detail, does not exclude the application of the principles of my invention in other specific embodiments.

Although primarily intended for water vessels, and described as applied thereto, the scope of use of my invention is not so limited. It may be employed for the automatic steering of any moving apparatus to which its characteristics make it applicable.

In the accompanying drawings:

Fig. 1 is an elevation with some parts broken away, taken athwartships and looking forward, showing a typical installation;

Fig. 2 is a vertical elevation looking from right to left in Fig. 1, with most of the casing removed;

Fig. 3 is a top plan of the housing of Fig. 1, showing a heading indicator;

Fig. 11 is a wiring diagram;

Fig. 12 is a fore-and-aft section through the compass and its mounting, as indicated by line 12—12 of Fig. 14, looking in the direction of the arrow;

Fig. 13 is a fragmentary horizontal section indicated by line 13—13 of Fig. 12, showing a detail of one of the feeler finger mountings which is broken away in Fig. 14;

Figure 16:
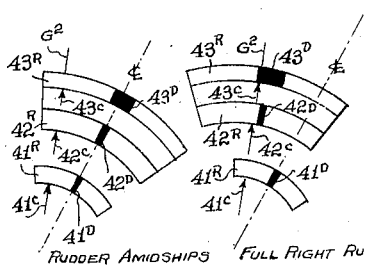
Figs. 16 to 20 are diagrams which correspond generally to Fig. 5 and show relative positions of the electrical controls in various stages of the steering action.

Throughout the specification and claims the terms "right" and "left," or R and L as parts of reference characters, are used with respect to rudder movements caused by the various elements so indicated; and the mechanism shown in the various drawings is for "straight chain" steering, where the ship's head moves in the same direction as the top of the wheel, all in accordance with the system of steering and helm orders used in the United States Navy.

General arrangement and operation

The automatic steerer consists in general of two parts, Fig. 1; namely, the control unit and the compass unit 11. The control unit, Figs. 1 to 10, is connected to the steering wheel shaft 12 and so controls the movement of the rudder, the direction and amount of this movement being determined by the compass unit, Figs. 13 to 16. In a typical installation the control unit is in a housing 13 suitably mounted, as for example on a transverse bulkhead. The compass unit 11 is mounted in some convenient location away from magnetic disturbances and within reach of the helmsman's station. Connection may conveniently be made from the compass unit to the control unit by means of a tubular support 14 and compass pull rod 15. The grouping of parts in a unitary housing is a matter of convenience only; it will be understood that modifications of the arrangement shown may be made if desired, according to the size of the boat and other circumstances. If the steerer is applied to an existing vessel it may be necessary to increase the length of the steering shaft 12.

Briefly stated, the operation is that the control unit makes corrective responses to the position of the vessel's head, such position being determined at frequent intervals by a feeler system (Fig. 15) in the compass unit 11. The compass unit is set by hand to the desired course, power is switched on to the steering motor 16 and control motor 17, and the power steering mechanism thrown into operative position by the shift lever 18. To return to hand steering, it is only necessary to throw out the shift lever. For hand steering or for watching the automatic steering, a heading indicator, Fig. 3, is provided at the top of the control unit housing which shows whether the vessel is on course or the amount and direction it is off course; being in effect a large scale compass which is easily read.

Control unit

As shown in Fig. 1, the steering motor 16 is connected by reduction gearing to drive shaft 20 and through a worm 21 on that shaft to a worm gear 22 on the steering shaft 12, the shaft 12 being connected to the rudder by any suitable means, not illustrated. A chain 23, kept taut by an idler 24, transmits power from a sprocket 25 fast on shaft 12 just forward of the hand steering wheel 26 to another sprocket 27 fast to a pinion 28 which is a part of the "steering motor controls" described further on. The sprocket 27 may be interchangeable in several sizes.

To throw out the automatic mechanism and allow manual steering, the shift lever 18 is moved to the right, disconnecting the worm 21 from the worm gear 22. A preferred arrangement is by mounting the drive shaft 20 in bearings 29 and 30 on a plate 31 which is pivoted at 32 near its lower end, and guided at 33 near the top. Spring 34 normally holds worm 21 engaged with worm gear 22. A notch 35 or other suitable device latches the parts in hand-steering position.

Steering motor controls, Figs. 1 and 4 to 10, inclusive

The general principle of this part of the mechanism is that of having a switch arm 40 move over contact segments 41, 42 and 43 in response to the compass position when the vessel leaves her course, thereby actuating the steering motor 16 which moves the rudder. Then as the ship swings back to the course the contact segments make a corresponding movement under the switch arm to cut power off the steering motor. The details of the compass unit mechanism are described hereafter, but for the purpose of understanding the steering action it is here noted that the compass unit includes a pair of scissors-like feelers 44, 45 to which a closing and opening motion is imparted at intervals by the control motor 17 through compass pull rod 15 and other connections. A pointer 46 on the compass swings between these feelers and is caught by them on their closing movement, and stops such closing movement at a more or less complete stage according to the position of the pointer. The extent of closing, which indicates whether the vessel is on course or how much and in which direction off is reflected in the position of the switch arm 40.

Figure 4:
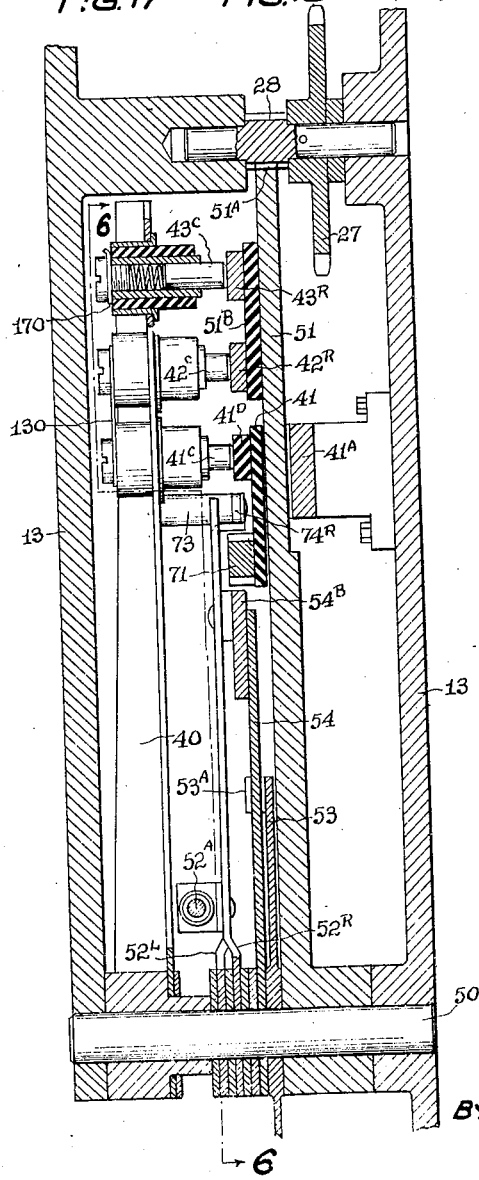
Fig. 4 is a fore-and-aft inclined section, generally on the plane 4—4 of Fig. 5, with some elements in elevation.
Figures 5, 6, 7:
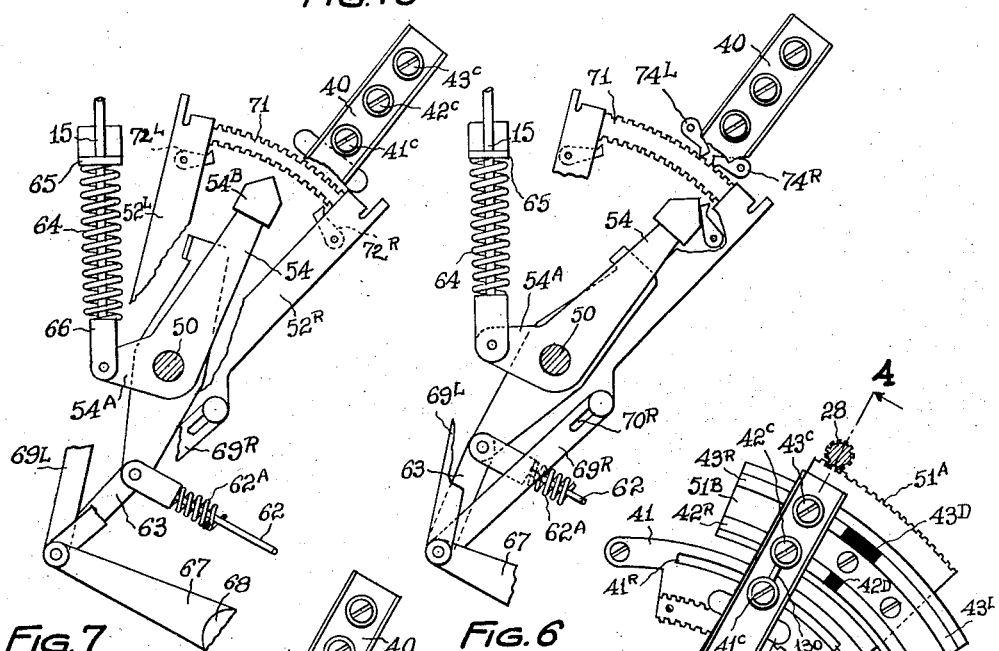
Fig. 5 is an enlarged detail from Fig. 1 with some features omitted, showing certain electrical switching elements.
Figs. 6, 7 and 8 are broken elevations all approximately as indicated by line 6—6 of Fig. 4, but showing successive positions in the operating cycle.

The switching mechanism comprises a system of arms, levers and links, principally swinging on pin 50. The system is actuated by the control motor 17, together with certain other related elements. As will best be seen in Fig. 4, the pin 50, which is horizontally fixed to the housing 13 or other suitable foundation, carries the following elements (naming them from forward to aft), each movable independently, so far as the pivot is concerned: a segment arm 51, a keeper 53, a locking arm 54, a setting arm 52R, a setting arm 52L, and the switch arm 40. A stationary segment 41, Figs. 1, 4 and 5, is secured at its ends to the forward wall of the housing 13, but offset therefrom to permit the segment arm 51 to swing beneath it, and a guide bar 41A may be used to hold segment arm 51 against forward thrust. Electrical contact segments 41R and 41L, with a dead element 41D between them, are secured to segment 41.

The segment arm 51 is toothed at its upper end at 51A for movement by pinion 28 simultaneously with movement of the steering shaft 12, and in the opposite direction to the rudder. The ratio of motion between 12 and 51 depends upon the size of the sprocket used. Arm 51 carries a cross piece 51B with two concentric sets of electrical contact segments, namely 42R and 42L with a middle space 42D, all on an inner radius, and 43R and 43L with a proportionately longer middle dead space 43D, all on an outer radius. The switch arm 40 swings over the stationary and movable segments, carrying three brushes or wiping contacts 41C, 42C and 43C aligned respectively with each series of contact segments. Brushes 41C and 42C are electrically connected by a bar 130. Wiring is shown only in Fig. 11.

The remainder of this mechanism can best be described along with a partial description of its action. The control motor 17 (Fig. 1) constantly oscillates a bell crank 60 through a crank and pitman 61 or other suitable connection. The down stroke (counterclockwise) of this bell crank pulls 62 to the right, compressing a spring 62A against a fixed lug 62B. The latter part of the same strike also closes a limit switch 153, as indicated by the dotted line positions of Figs. 1 and 11, for purposes explained hereafter under the heading "Electrical system."

Figure 8:
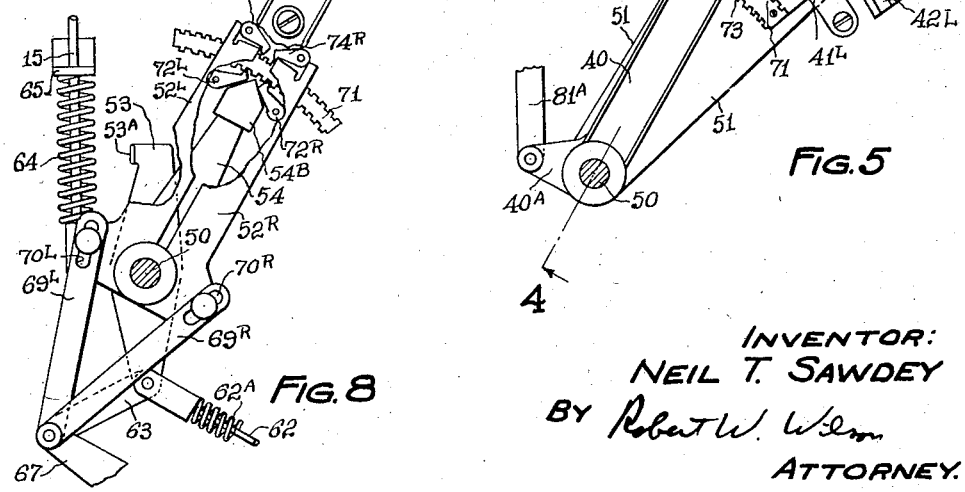
Figure 15:
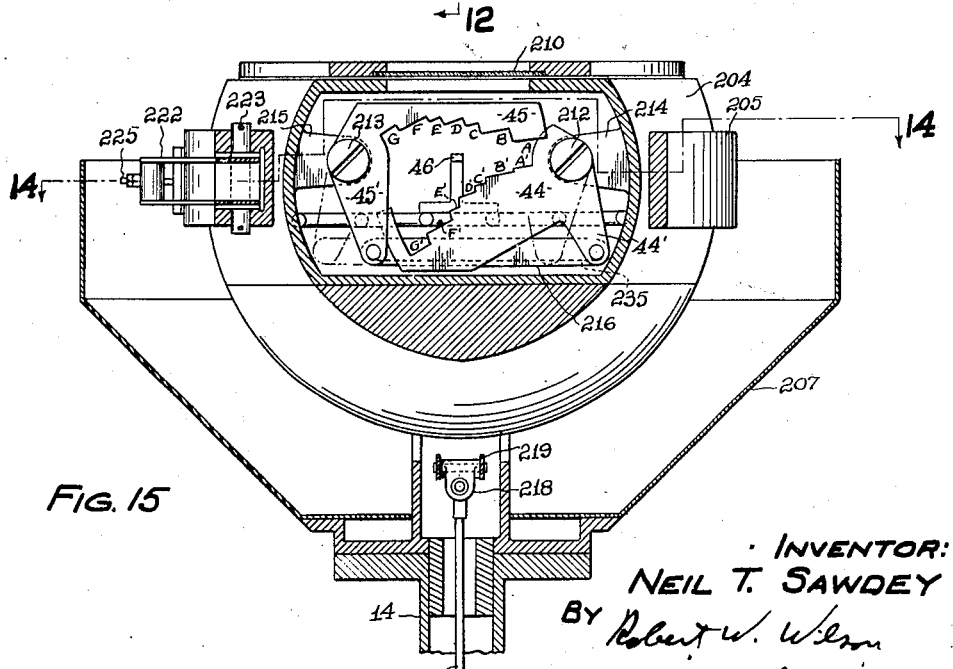
Fig. 15 is an irregular broken section, as indicated by line 15—15 of Fig. 14, in the direction of the arrows.

The pull of rod 62 breaks toggle 63 to the right, Fig. 8. The upper arm of the toggle is the keeper 53, a centrally-pivoted lever whose upper end includes a side finger 53A projecting aft far enough to engage the left edge of the locking arm 54, Fig. 6. Pull rod 15 is pivoted to a side branch 54A of the locking arm. A compression spring 64 bears at its upper end on a lug 65 fast to the forward wall of the housing 13, and bears downward at its lower end against a fork 66 which connects the rod 15 to arm 54A; thus when the force of spring 64 is not overcome there is a downward pull on the rod 15 which closes the compass feelers 44 and 45 as far as the position of the pointer 46 will permit (Fig. 15). Further movement of toggle 63 to the right moves an approximately horizontal arm 67 upward around its stud 68 on the forward housing wall. Setting arm links 69R and 69L are pivoted at their lower ends to the free end of arm 67, and slottedly and rotatively pinned at their upper ends to lower side extensions of setting arms 52R and 52L, respectively, as shown at 70R and 70L. The setting arms are bell crank levers, both swinging on the pivot 50, but as shown in Fig. 4 are in the same plane except at their bearings, so cannot pass one another. The setting arms are drawn together by suitable mechanism 52A such as a connecting rod with compression spring thereon. Straightening the toggle 63, which lowers arm 67 spreads the setting arms.

It will be recalled that the locking arm 54 (which is wedge-topped as at 54B) is positively connected through pull rod 15 to the scissors feelers 44, 45, the result being that the position locking arm 54 assumes is directly dependent upon the degree to which the feelers can close on the down stroke of the rod, which in turn is governed by the relation of the compass pointer 46 to the course set. Consequently when the toggle 60 is pulled from the extended position of Fig. 6 to the broken position of Fig. 7 and the leftward movement of keeper finger 53 clears locking arm 54, allowing the latter to be moved leftward by spring 64, the end position of such movement depends on whether the vessel is on course or how much off and which way. The setting arms keep on their mutually approaching swing as the pull of rod 62 continues, until first one and then the other is stopped by the locking arm 54. The slotted connections at 70R and 70L allow sufficient independence of movement so that either 52R or 52L, as the case may be, can finish its closing movement after the other stops.

The locking mechanism includes a fixed arcuate rack segment 71, toothed on upper and lower edges, conveniently located slightly below stationary segment 41. Up-nosed pawls 72R and 72L on the respective limit arms ride up the sides of wedge 54B into engagement with bottom notches of rack 71. These pawls are so shaped that they do not prevent outward movement of their respective setting arms.

Figures 9, 10:
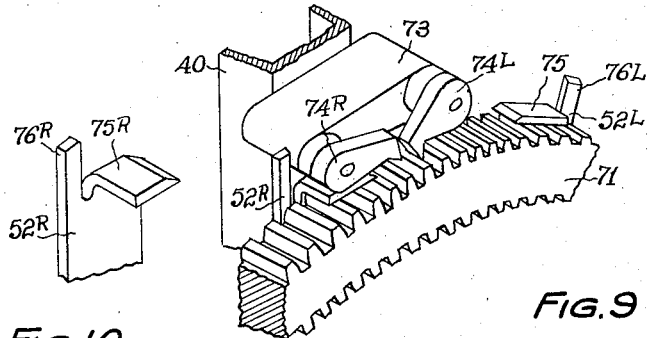
Fig. 9 is an enlarged perspective detail of certain elements from Figs. 5 to 8, but looking aft.
Fig. 10 is a further enlarged perspective detail from Fig. 9, looking in the same direction as in Fig. 9.

The function of the limit arms is to set the switch arm 40 in position corresponding to that of locking arm 54, in order to initiate the necessary rudder movement. This is accomplished by mechanism shown in detail in Figs. 9 and 10. The switch arm carries a transverse boss 73 on its forward face (using forward in the sense of towards the bow of the vessel, although away from the observer in Figs. 1 and 5 to 8), to which a pair of inwardly directed down-nosed pawls 74R and 74L are pivoted as best seen in Fig. 9. The noses of these pawls are so shaped as to ride over the upper teeth of rack 71 when the pivot is leading and the tail trailing, but to lock when the tail is leading. That is, 74R will click over the teeth when switch arm 40 moves counterclockwise in Fig. 9 (clockwise in Figs. 5 to 8), but 74L will lock, and vice versa. However, when setting arm 52R swings clockwise in Fig. 9, a horizontal lip 75R, Fig. 10, rides under the pawl 74R and lifts its nose clear of the rack teeth, as shown in Fig. 10, while an upstanding finger pushes against boss 73 to move the arm 40. Opposite movement is accomplished by similar elements correspondingly designated "L" instead of "R."

A side crank 40A rigid with the switch arm 40 actuates a linkage 81A to 81D inclusive, Figs. 1 and 5, which moves a hand 82, Figs. 1 and 3 against an index 83, thereby indicating the correction being applied, if any. The hand may be adjusted as at 84. The linkage is counterweighted at 86.

*Compass unit, Figs. 1 and 12 to 15, inclusive*

The compass unit 11 is most conveniently mounted above and offset from the hand steering wheel 26 on a suitable support such as a stout tube or pipe 14. The unit can be swung on a vertical axis, set in position for the course to be steered according to a course scale 201 which is graduated for full 360° around the base of the unit and read against a stationary variation scale 202 on the mounting 14, and the unit is secured by a clamp 203. (See Figs. 1 and 12.)

The compass is of marine type with the usual bowl 204 mounted in a gymbal ring 205 within the casing 207. As in ordinary practice there are several magnet bars 208 carried by a float 209, under a liquid-tight glass 210. A finger 46 is attached to one end of the center pair of magnet bars and is balanced both for weight and for liquid resistance by a similar finger 46' on the opposite end of the same bars. The motion of the finger 46 is limited by two opposed feeler leaves 44 below and 45 above, horizontally pivoted at 212 and 213 to ears 214 and 215 respectively, inside the bowl 204.

Figure 14:
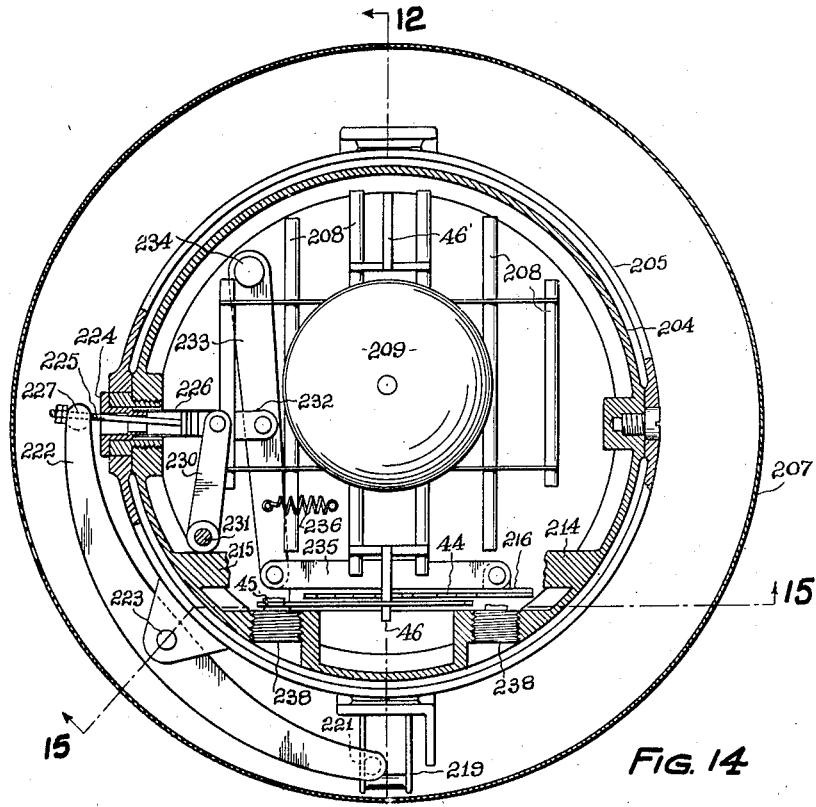
Fig. 14 is a horizontal section, with parts in elevation, approximately as indicated by line 14—14 of Fig. 12, but with certain mounting details broken away.

As seen in Figs. 14 and 15 the feelers 44 and 45 are overlapping bell-crank levers having their respective depending arms 44' and 45' pivoted to a horizontal link 216. The opposed approximately horizontal edges of the feelers are formed in steps A to G and A' to G' of varying depth and length, and it will be observed that the effective lengths of opposing steps are equal. The finger 46, which in the present illustration is the north finger, projects between the two feelers. It is apparent that the feelers can move towards one another to the least extent when the finger 46 is between the steps A—A' and to the greatest extent when between the steps G—G'. Alternate closing and opening scissor-like motion is constantly imparted to the feelers through the pull rod 15 from the continuously rotating control motor 17, as previously described.

The top of the pull rod 15 reaches into the bottom of the compass casing 207 where it is universally jointed as at 218, in the axis of rotation of the casing, to the lower end of a lever 219 disposed in a vertical fore-and-aft plane and curved to fit between the compass bowl 204 and casing 207. Pivoted intermediate its ends as at 220 to the casing 207, this lever does not participate in any swinging of the compass bowl due to a roll or pitch of the ship. Another universal joint 221 connects the top of lever 219 to one end of another first-class lever 222, horizontally disposed around the edge of the compass bowl 204 and fulcrummed to the gymbal ring 205, as at 223. The gymbal joint 224 is hollow to allow passage of a rod 225 into the compass bowl, leakage of alcohol being prevented by a flexible sleeve 226. The rod 225 is pivotally and adjustably connected to the far end of lever 222, as shown at 227.

The inner end of the rod 225 is pinned to the free end of a lever 230 fast to a short vertical shaft 231 in bearings near the edge of the compass bowl, clearing the swing of the magnet bars 208. A lower lever below the magnet bars and hidden by 230 in Fig. 14 and by 233 in Fig. 12, connects by a link 232 to the middle of a third-class lever 233 having its fulcrum 234 in the bowl opposite 231 and its free end, which is near 231, vertically pivoted to a link 235 which is fast to the feeler arm connecting link 216, previously described. A spring 236 constantly pulls lever 233 counterclockwise, urging the feelers to the open position shown in full lines in Fig. 15. The ends of the link 216 are horizontally pivoted to the depending arms 44' and 45' of the feelers 44 and 45 respectively. Thus movement of link 216 to the right (full lines of Fig. 15) opens the feelers and movement to the left (dotted lines) closes them. Consequently, the down stroke of rod 15 closes the feelers. This down stroke is caused by counterclockwise movement of bell crank lever 60, which also closes the limit switch 153.

A preferred mechanism for the mounting of feeler 44 is shown in Fig. 13. The mountings of both fingers are broken away in Fig. 14 so as not to hide parts of the linkage 216—235. The pivot 212 is a large-headed filister screw, threaded into the ear 214, locked by nut 237, and holding the feeler 44 under its head between washers. The pivot is inserted through a suitable opening 238, afterwards plugged. The mounting for feeler 45 is a left-handed counterpart of Fig. 13.

Briefly, the action of this part of the mechanism is that the feelers 44, 45 are constantly opening and closing, being opened by spring 230 each time the rod 15 is up, which is once at every revolution of crank 61. When the feelers are open the compass magnet system is free to swing. When the feelers close they catch the finger 46 between one or another opposed pair of the steps, such as A—A' and so on, according to the directional position of the finger 46, thus more or less restricting the feeler closing action according to the angle and side the vessel is off her course. Such restriction of feeler closing is translated into correction action on the rudder by the steering motor controls.

*Electrical system, Figs. 1, 4, 5, 11 and 16 to 20, inclusive*

The preferred specific mechanism of brushes and segments is best seen in Figs. 4 and 5, and for the most part has been described. Referring now particularly to Fig. 11, the brushes and contact segments are parts of circuits which operate control relays 150R and 150L for the steering motor 16. In the embodiment herein shown and described the power for the entire system may conveniently be taken from a battery 152, although for larger installations, where the motor 16 would ordinarily operate at higher voltage than the relay circuits, appropriate modifications could be made from the exact circuits shown in Fig. 11. It will be noted that the control motor 17, which runs constantly so long as mechanical steering is used, is not included in Fig. 11.

The brush track on each of the three contact segments comprises a middle dead space and a live contact bar at each side, reference letters D (dead), R (right) and L (left) being added to the reference character for the segment to indicate such divisions. The upper dead space 43D is wider than the two lower ones. The division between right and left 43R and 43L movable upper segments and 42R—42L are to govern the directions of rudder swing, but the stationary lower segment is divided only for the purpose of giving a middle dead space 41D.

The wiring diagram of Fig. 11 shows the positions of parts when the rudder is amidships, coinciding with central position of segment arm 51, but the vessel 20° or more off course to the left, as might be caused by wind or other conditions. For convenience of illustration the central position of the segments is shown as vertical, although in the actual mechanism an inclined central position gives a more convenient arrangement. In Figs. 11 and 16 to 20 the movable switch arm 40 and segment arm 51 are omitted entirely, the brushes 41C, 42C and 43C are indicated by arrow heads and a center line CL is shown for reference. The center line is inclined in Figs. 16 to 20 as in Fig. 1 and others.

With the vessel 20° off course to the left, the north finger 46 of the compass will be between steps G and G' of the feelers, with the result that when the pull rod 15 moves down the feelers reach maximum closing position. This allows the rod to make its complete downward movement, swinging locking arm 54 to extreme left, which results in the switch arm 40 being carried to extreme left, as indicated by the line G², Figs. 11 and 16. It will be recalled that the setting of the switch arm 40 is through the linkages which are actuated by control motor 17 through bell crank 60. The connection includes the spring 62A, which allows crank 60 to complete every stroke no matter where the position of compass finger 46 causes the other elements of the mechanism to stop. Thus the spring-opened limit switch 153 is closed briefly during each cycle, as indicated by the dotted positions of Figs. 1 and 11. When closed, current from battery 152 flows along wires 171 through switch 153 to segments 41L and 41R. Arm 40 now being in position G², current flows through brush 41C, wire 180, brush 42C to segment 42R, then through lead 178R to the solenoid coil of a conventional control relay 150R, and returns through line 170 to the battery. The circuit through the coil of 150R causes the coil to draw down its armature 160R, closing contacts at 153R and 16CR. Contact 153R completes circuit from 175R to 174R to segment 43R and through brush 43C and wires 170 and 171 to battery. This circuit maintains current through the coil of relay 150R even after limit switch 153 is opened, thus holding contacts 16CR and 153R closed until the desired cycle is completed as described below.

The simultaneous closing of contact 16CR completes a circuit from battery 152 through leads 171, 171R and 172R to a field coil 16R and the armature circuit 16A of the double field steering motor 16 and thus causes the motor to revolve in the direction to produce right movement of rudder.

This rotation of motor 16 turns shaft 20 (Fig. 2), revolving the steering shaft 12 clockwise through the worm and gear 21 and 22 and revolution of shaft 19 turns sprocket 24. This movement is transmitted by sprocket chain 23 to pinion 28, which swings the segment arm 51 leftward.

Meanwhile the continued revolution of the control motor 17 has allowed spring 62A to move rod 62 leftward, straightening the toggle 63, spreading the setting arms 52R and 52L, and thus freeing the control so that it can respond to the compass indication at the next cycle. This freeing movement is accompanied by a lift of the rod 15 which, simultaneously with the action of spring 236, opens the feelers and lets the compass magnets swing. However, the pawls 74R and 74L remain engaged in their rack, so holding the switch arm locked until the next closing of the feelers 44—45.

Figure 17:
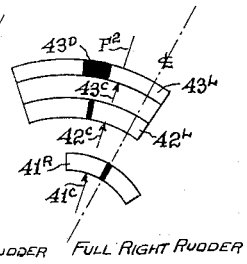

As the segment arm 51 swings to the left, the contacts 43R and 42R are moved under the corresponding locked brushes 43C and 42C until the dead spot 43D passes under brush 43C, as shown in Fig. 17. This breaks circuit through line 174R, deenergizes the coil of 150R, spring 161R lifts the armature 160R and breaks contact at 16CR, thus interrupting the circuit through 172R and stopping the steering motor 16. The worm and gear 21 and 22 having a low enough helix angle to be self locking, the steering shaft 12 is held from turning by the worm 21 so long as the worm shaft 20 is stationary. The length of dead spot 43D is such as to stop the movement of the rudder while the rudder is still some appreciable distance to the right of the amidships position as shown by the leftward displacement of the movable segments from the center line in Fig. 17. This is done to prevent a continual hunting action and to allow a slow adjustment of the rudder when near the amidships position and thus find a position slightly off center to compensate for effects of wind, propeller action, etc., which may cause a continual trend of the vessel to one side or another of the desired course.

This slow adjustment is accomplished as follows: As the vessel approaches the desired course due to previous movements of the mechanism, dead spot 43D eventually comes under brush 43C, as already explained. At this time the rudder may be say 10° off amidships. When control motor 17 closes limit switch 153 as previously described, the same circuits are completed as before with the exception of the holding circuit through brush 43C. Therefore the solenoid of relay 150R is energized only as long as limit switch 153 is held closed by lever 60. Since the control motor closes the limit switch at frequent intervals, a slight jogging action occurs, running the steering motor 16 only during the short periods of limit switch closure, and so imparting short corrective movements to the rudder unless contact 42C is also on its dead spot 42D. If the segment 42R is under the brush this corrective movement is to the right, if 42L is under, the movement is leftward. The length of dead spot 42D is only enough to prevent brush 42C from contacting 42R and 42L simultaneously.

When the compass indicates the vessel to be on course, in which event the step D—D' on the feelers 44—45 close upon the pointer 46, the switch arm 40 is central, with brush 41C on dead spot 41D and no current flows to brush 42C, consequently no movement of the steering motor occurs.

This sequence has been described for a right rudder action but it is evident that a similar action occurs for left rudder when contacts 42L and 43L are under their brushes. In this case the relay 150L acts, the various circuits and other elements marked L in Fig. 11 come into play, and the steering motor 16 is operated through its reverse field 16L. A double field motor has been indicated but a similar result may be obtained by suitable contacts on other types of reversible motors.

Figure 18:
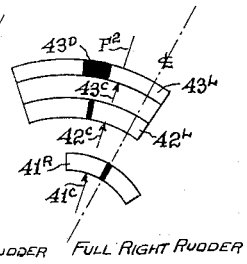
Figure 19:
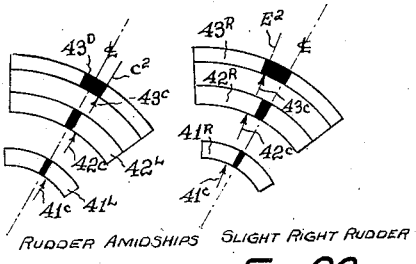
Figure 20:
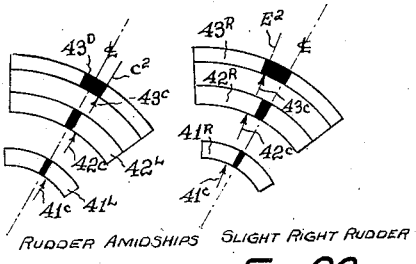

Figs. 18, 19 and 20 show action of the electrical controls in other situations than those described. In Fig. 18 the position F² of the brushes is that resulting from compass finger 46 being caught between feeler steps F—F', the rudder being as far right as in Fig. 17. The left holding relay 150L is brought into action, the circuits established being the left counterparts of those described as to Fig. 11, energizing the left field 16L of steering motor 16, the result being that the rudder is moved leftward and the movable segments are moved toward the center line CL.

In Fig. 19, with rudder amidships the compass finger has been caught between steps C—C', bringing the brushes to a position C². The only electrical contacts effective are 41D—41L and 42D—42L so that leftward jogging action ensues. Fig. 20 illustrates a situation where there is a slight right rudder but the compass finger has been caught between steps E—E', causing brush position E², indicating a need to swing the bow slightly to the right. The relation of brushes and dead spaces is the same as in Fig. 17, which causes jogging to the right.

The sensitivity of the steering depends on the length of the feeler steps. For the specific feelers shown in Fig. 15 there is no correction for less than 1° swing off in either direction; a swing off course between 1° and 5° to the right will cause the finger 46 to be caught by steps C—C', and bring arm 40 to the position C² (as in Fig. 19); between 5° and 12½° right, steps B—B'; from 12½° to 20° right, steps A—A'; correspondingly for swings to the left; between 1° and 5°, E—E' and position E² for arm 20 (as in Fig. 20); between 5° and 12½°, F—F' and position F² for arm 20 (as in Fig. 18); from 12½° to 20° steps G—G' and position G² (as in Figs. 16 and 17).

My apparatus can be simplified, but at the expense of steadiness of steering, by the limit switch 153, control motor 17, segments 43R and 43L brush 43C and the holding circuits, and connecting 42R and 42L directly to 16R and 16L, respectively. So simplified there would of course be no jogging action. Movement of the brush 42C off dead space 42D would start the steering motor, and corrective movement of the motor would bring the dead space back under the brush, thus stopping the motor.

It will be understood that my invention is capable of being modified in forms and arrangement of parts as may be advantageous for varied requirements of size of the vessel on which installed, power available, nature of service conditions it is expected to meet, and other factors. It will be further understood that the mechanisms and electrical connections and circuits shown and described are preferred but not exclusive forms, and that various modifications thereof may be made without departing from the teaching and principles of my invention. The embodiment shown and described is therefore intended as an illustration of a preferred form of my invention and not as a limitation thereon.

What I claim is:

1. Steering apparatus comprising in combination, a compass, a rudder, a driving motor for said rudder, switching controls for said driving motor, and a mechanical connection between said compass and said switching controls; said mechanical connection comprising intermittently-acting feelers responsive to the direction of said compass, an electrical contact-carrying element responsive to the response of said feelers, and another electrical contact-carrying element responsive to the position of said rudder.

2. In an automatic steering mechanism, in combination, a direction-indicating element, a feeler mechanism adapted to make intermittent responsive contact therewith, a steering motor, and a switch mechanism governing the action of said motor, said switch mechanism including a switch arm; connecting elements between said feeler mechanism and said switch arm whereby to position said switch arm according to said responsive contact; said connecting elements including switch-arm-setting means adapted to make intermittent setting contact with said switch arm; and a prime mover causing synchronous intermittent movement of said feeler mechanism and said switch-arm setting means.

3. In an automatic steering device in combination a movable case having therein a compass, feelers cooperative therewith to determine the compass position, and stops limiting the compass swing to the area of feeler action; mechanism for intermittently moving said feelers into position to stop compass swing and concurrently to determine compass direction; a contact-carrying arm movable into successive positions corresponding to successive feeler closing positions and means adapted to hold said arm for a limited time in each of said successive positions, a plurality of contact segments with respect to which said contact-carrying arm is movable; a steering motor and a rudder driven thereby, electrical connections between said rudder and certain of said segments for moving said certain segments in accordance with rudder movement; a source of electrical power and a plurality of circuits between said power source and said steering motor; a limit switch acting upon all of said circuits effective when open to prevent starting of said steering motor; an operative connection between said feeler-moving mechanism and said limit switch effective to close said limit switch momentarily at the beginning of feeling action; holding switches in certain of said circuits for keeping said steering motor running after said limit switch opens; whereby when said feelers close a movement is initiated in the steering motor to alter the rudder position according to the amount the vessel is off course, and whereby said alteration is continued until return to course.

4. In an automatic steering mechanism in combination a compass unit, a control unit, a motor for actuating said units in synchronism, a rudder-driving motor, and electrical circuits controlled by said control unit for operating said rudder-driving motor; said compass unit comprising a direction-pointer and a pair of feelers adapted to engage said pointer at positions dependent on the pointer position; said control unit including a swingable locking arm adapted to be positioned according to said engaging position of said feelers and a toggle having a keeper member which when extended holds said locking arm to one side of its swing and when the toggle is broken allows said locking arm to swing; a rod connecting said feelers and said locking arm; a spring on said rod adapted to move said rod in a direction to close said feelers and simultaneously to swing said locking arm away from the position in which the keeper holds it; a linkage train connecting said actuating motor, said toggle, and said locking arm; and a spring associated with said linkage train adapted to break said toggle and thereby remove said keeper from said locking arm, thereby also freeing said connecting rod to respond to its spring and thereby move said feelers to feeling position and said locking arm to position corresponding to the position of the feelers.

5. In an automatic steering mechanism in combination a compass unit, a control unit, a motor for actuating said units in synchronism, a rudder-driving motor, electrical circuits controlled by said control unit for operating said rudder-driving motor and a visual indicator; said compass unit comprising a direction-pointer and a pair of feelers adapted to engage said pointer at positions dependent on the pointer position; said control unit including a swingable locking arm adapted to be positioned according to said engaging position of said feelers and a toggle having a keeper member which when extended holds said locking arm to one side of its swing and when the toggle is broken allows said locking arm to swing; a rod connecting said feelers and said locking arm; a spring on said rod adapted to move said rod in a direction to close said feelers and simultaneously to swing said locking arm away from the position in which the keeper holds it; a linkage train connecting said actuating motor, said toggle, and said locking arm; and a spring associated with said linkage train adapted to break said toggle and thereby remove said keeper from said locking arm, thereby also freeing said connecting rod to respond to its spring and thereby move said feelers to feeling position and said locking arm to position corresponding to the position of the feelers; said control unit also including a switch arm for switching said circuits and setting arms for bringing said switch arm to a position opposite said locking arm and locked thereby; said visual indicator including a pointer and a linkage connecting said pointer with said switch arm.

6. A direction-responsive control device comprising in combination a switch arm with a plurality of brushes carried thereby, a plurality of fixed electrical contacts over which certain of said brushes are adapted to be carried by movement of said arm; another plurality of electrical contacts and means for moving same as a unit with respect to other brushes carried by said switch arm, and means for moving said arm to a predetermined position, said means comprising two setting arms, elements adapted to engage each of said setting arms independently with said switch arm to move the latter only in that direction which carries said setting arms toward one another; and a direction-responsive element adapted to lock said setting arms individually against further inward movement, whereby said switch arm is positioned correspondingly to said direction-responsive element.

7. A direction-responsive control device comprising in combination a feeler unit intermittently responsive to directional changes, a motor adapted to cause appropriate responses to such changes, and means for controlling said motor; said controlling means comprising a switch arm, a locking arm; a keeper arm; and mechanical connections respectively between said locking arm and said keeper arm, and between said locking arm and said feeler unit; whereby said keeper arm intermittently releases said locking arm and whereby during such release said locking arm assumes a position determined by said feeler unit, and said switch arm is positioned correspondingly to said locking arm.

8. A direction-responsive control device comprising in combination a feeler unit intermittently responsive to directional changes, a motor adapted to cause appropriate responses to such changes, and means for controlling said motor; said controlling means comprising a switch arm with a plurality of brushes carried thereby, a direction-responsive locking arm, a keeper arm, and mechanical connections respectively between said locking arm and said keeper arm, and between said locking arm and said feeler unit; whereby said keeper arm intermittently releases said locking arm and whereby during such release said locking arm assumes a position determined by said feeler unit and said switch arm is positioned correspondingly to said locking arm; said means for moving said switch arm comprising two setting arms, elements adapted to engage each of said setting arms independently with said switch arm to move the latter only in that direction which carries said setting arms toward one another, said locking arm being adapted to lock said setting arms individually against further inward movement; a plurality of fixed electrical contacts over which certain of said brushes are adapted to be carried by movement of said arm; another plurality of electrical contacts and means for moving same as a unit with respect to other brushes carried by said switch arm; and a plurality of circuits for driving said motor, said brushes and fixed and movable contacts being included in said circuits.

9. In an automatic steering mechanism a compass unit comprising in combination a compass, a finger carried by the needle system of said compass, feelers alongside the space wherein said finger can swing, mechanism causing said feelers to make contact with said finger at intervals of time, and members of varying dimensions on said feelers adapted to terminate said contacting movement in accordance with the position of said finger.

10. In an automatic steering mechanism a compass unit comprising in combination a compass, a finger carried by the needle system of said compass, stops defining the space wherein said finger can swing, feelers alongside said space, mechanism causing said feelers to make contact with said finger at intervals of time, and edges of varying depth on said feelers adapted to terminate said contacting movement in accordance with the position of said finger.

11. In an automatic steering system a compass unit comprising in combination a compass, a finger carried by the needle system of said compass, a pair of opposed feelers above and below the path of said finger, means for imparting intermittent scissors action to said feelers to close upon said finger, stepped opposed edges on said feelers, said steps being of different depths whereby the extent of closing of said feelers is determined by the position of said finger at time of closing.

12. In an automatic steering system a compass unit comprising in combination a compass, a finger carried by the needle system of said compass, stops limiting the swing of said finger to a definite space, a pair of opposed feelers above and below said space, means for imparting intermittent scissors action to said feelers to close upon said finger, stepped opposed edges on said feelers, said steps being of different depths whereby the extent of closing of said feelers is determined by the position of said finger at time of closing.

13. Automatic steering apparatus comprising in combination a compass, means for determining the indication of said compass, a rudder, a steering motor for actuating said rudder, and control means for said steering motor, said control means comprising two members movable relative to one another, means for moving one member according to compass indication and the other according to rudder position, electrical contact elements on each member mutually connectable to close a directional circuit to said steering motor, a dead space separating said contact elements on said rudder-responsive member, thereby dividing the contact elements thereon into sections one of which, when in circuit, drives said steering motor in one direction and the other of which, when in circuit, drives it in the opposite direction.

14. An automatic steering device comprising in combination a compass, a motor, a rudder driven thereby, a source of power, and a switching mechanism, mechanical connections from said compass to said switching mechanism responsive to the direction of vessel heading, said switching mechanism comprising a limit switch effective as to all circuits, two holding circuits selectively operable for by-passing said limit switch, a driving circuit controlled by each of said holding circuits to drive said motor forward or backward, a stationary contact, a contact movable according to rudder movement, and electrical connections between said stationary and movable contacts which are selectively set according to direction of vessel heading.

15. In an automatic steering apparatus a steering motor and circuits for controlling said motor to run either forward or backward, said circuits comprising a plurality of brushes and a movable arm carrying them, fixed contact segments over which one of said brushes moves, and other contact segments over which the other brushes move, said other segments being fixed to a carrying arm, mechanical connections to a direction-responsive device for moving said brush-carrying arm to a position determined by such device, and mechanical connections to the steering motor for moving said segment-carrying arm correspondingly to those movements of said steering motor which are occasioned by the setting of said brush-carrying arm.

NEIL T. SAWDEY.